(12) United States Patent
Lee

(10) Patent No.: US 11,319,465 B2
(45) Date of Patent: May 3, 2022

(54) METHOD FOR MANUFACTURING FINE-PITCH ANISOTROPIC CONDUCTIVE ADHESIVE AND FINE-PITCH ANISOTROPIC CONDUCTIVE ADHESIVE MANUFACTURED BY SAME METHOD

(71) Applicant: Kyung Sub Lee, Suwon-si (KR)

(72) Inventor: Kyung Sub Lee, Suwon-si (KR)

( * ) Notice: Subject to any disclaimer, the term of this patent is extended or adjusted under 35 U.S.C. 154(b) by 163 days.

(21) Appl. No.: 16/483,994

(22) PCT Filed: Feb. 6, 2017

(86) PCT No.: PCT/KR2017/001283
§ 371 (c)(1),
(2) Date: Aug. 6, 2019

(87) PCT Pub. No.: WO2018/143501
PCT Pub. Date: Aug. 9, 2018

(65) Prior Publication Data
US 2020/0010738 A1    Jan. 9, 2020

(51) Int. Cl.
| | | |
|---|---|---|
| *C09J 9/02* | (2006.01) | |
| *C09J 11/04* | (2006.01) | |
| *C09J 11/06* | (2006.01) | |
| *C08K 9/04* | (2006.01) | |
| *C08K 3/08* | (2006.01) | |
| *C08L 63/04* | (2006.01) | |
| *C09J 7/00* | (2018.01) | |
| *C09J 163/04* | (2006.01) | |
| *B23K 35/38* | (2006.01) | |

(52) U.S. Cl.
CPC .............. *C09J 9/02* (2013.01); *B23K 35/38* (2013.01); *C08K 3/08* (2013.01); *C08L 63/04* (2013.01); *C09J 7/00* (2013.01); *C09J 163/04* (2013.01); *C08K 2003/0806* (2013.01); *C08K 2003/0837* (2013.01); *C08K 2201/001* (2013.01); *C09J 2203/318* (2013.01); *C09J 2400/16* (2013.01); *C09J 2463/00* (2013.01)

(58) Field of Classification Search
None
See application file for complete search history.

(56) References Cited

U.S. PATENT DOCUMENTS

| | | | | |
|---|---|---|---|---|
| 4,298,407 A | * | 11/1981 | Taylor | ................ B23K 35/0244 |
| | | | | 148/24 |
| 6,802,446 B2 | * | 10/2004 | Chaudhuri | ................ C09J 9/02 |
| | | | | 228/175 |
| 2010/0147567 A1 | * | 6/2010 | Hino | ...................... C22C 12/00 |
| | | | | 174/257 |
| 2010/0200160 A1 | * | 8/2010 | Kumakura | ............... C09J 11/04 |
| | | | | 156/325 |
| 2016/0381801 A1 | * | 12/2016 | Saruyama | |

FOREIGN PATENT DOCUMENTS

| | | |
|---|---|---|
| KR | 10-2009-0075702 A | 7/2009 |
| KR | 10-2011-0053058 A | 5/2011 |
| KR | 10-1096677 B1 | 12/2011 |
| KR | 10-2013-0109235 A | 10/2013 |
| KR | 10-2017-0062049 A | 6/2017 |

OTHER PUBLICATIONS

Kim, Hyo Mi et al., Enhancement of Wetting Characteristics for Anisotropic Conductive Adhesive With Low Melting Point Solder via Carboxylic Acid-based Novel Reductants, Polymer, 2010, vol. 34, No. 1, pp. 52-57.

* cited by examiner

*Primary Examiner* — Michael J Feely
(74) *Attorney, Agent, or Firm* — Novick, Kim & Lee, PLLC; Jae Youn Kim; Jihun Kim

(57) ABSTRACT

The provided relates to a method for preparing an anisotropic conductive adhesive for fine pitch and an anisotropic conductive adhesive for fine pitch prepared by the same method. Provided is a method for preparing an anisotropic conductive adhesive for a fine pitch including: (i) removing an oxide film of solder particles having self-fusion and self-orientation functions between metal terminals of a substrate by melting the solder particles at a predetermined temperature using a first reducing agent; (ii) removing moisture generated in step (i); and (iii) preparing an anisotropic conductive adhesive by mixing the solder particles from which the oxide film and the moisture are removed with a binder resin in steps (i) and (ii), in which step (iii) is performed in a state where a contact with oxygen is blocked.

15 Claims, 2 Drawing Sheets

METHOD FOR MANUFACTURING FINE-PITCH ANISOTROPIC CONDUCTIVE ADHESIVE AND FINE-PITCH ANISOTROPIC CONDUCTIVE ADHESIVE MANUFACTURED BY SAME METHOD

TECHNICAL FIELD

The present invention relates to a method for preparing an anisotropic conductive adhesive for fine pitch and an anisotropic conductive adhesive for fine pitch prepared by the same method, and more particularly, to a method for preparing an anisotropic conductive adhesive for fine pitch and an anisotropic conductive adhesive for fine pitch prepared by the same method capable of reducing solder particles in advance and blocking oxygen in a process of preparing the anisotropic conductive adhesive to prevent an oxide film from being formed on the surface of the solder particles, improving wettability, and making fine pitching of electronic components.

BACKGROUND ART

A conventional anisotropic conductive adhesive film or paste contains conductive particles and an adhesive component cured by heat, and is mainly used for electrical connection between an LCD panel and a TCP or a PCB and a TCP. The corresponding film is a type in which a conductive filler contained in a resin composition is connected to upper and lower terminals to seek electrical conductivity by mechanical/physical contact, but since the film is physically contacted only by a specific contact point, there are disadvantages of unstable contact resistance, low bonding strength, and ion migration due to relatively low conductivity. In addition, since the conductive filler used in the corresponding technique requires separate noble metal plating and insulation treatment on polymer elastic balls having a uniform size below a required pitch, quality control is difficult and cost is expensive. In addition, in the related art, in order to contact the conductive filler, separate expensive equipment called a hot bar is required, and as the pressure is necessarily applied in addition to the temperature and time, damage may be caused to a circuit board or chip to be deposited and other ITO glass.

In order to solve these problems, self-fusion conductive adhesives have been developed. The adhesive selectively induces a connection through a metal bond to desired upper and lower terminals by simply heating the solder particles to a temperature equal to or higher than the melting point of the solder particles without pressure. As a result, it is possible to improve the adhesion between the adherends, stabilize contact resistance, and protect parts to be adhered from being damaged due to pressure as the problems in the related art. However, due to the oxide film formed around the solder particles, unstable contact resistance, low conductivity, bond strength and unstable electric characteristics are generated. As a method to solve the problem, it has been confirmed that wetting of solder particles is improved by using a reducing agent such as a carboxylic acid to enhance bonding with contact points of wirings and signal lines, and in the preparation of the anisotropic conductive adhesive, a reducing agent is added and mixed together with the solder particles and the binder resin to prevent the oxide film on the surface of the solder particles.

In Korean Patent Registration No. 10-1096677 (Title of invention: Anisotropic conductive adhesive, method for forming nano conductive pattern using the same and method for mounting electronic parts, hereinafter referred to as related art 1), disclosed is a method for forming a nano conductive pattern comprising: (a) disposing an anisotropic conductive adhesive on a substrate formed with a wetting area, wherein the anisotropic conductive adhesive includes conductive particles which are meltable and have a particle size of 1 nm to 30 µm and a polymer in which curing is not completed at a melting point of the conductive particles; (b) forming a conductive layer on the surface of the wetting area by heating the anisotropic conductive adhesive to a temperature in which the conductive particles are molten and the curing of the polymer is not completed; (c) curing the polymer by heating the polymer at a curing temperature or more; and (d) selectively removing the cured polymer from the surface of the substrate in which the wetting area is not formed.

SUMMARY OF INVENTION

Technical Problem

The related art 1 is to prevent an oxide film on the surface of the solder particles by adding a surface activating resin serving as a reducing agent to the anisotropic conductive adhesive in the dependent claim. However, in this case, there are a first problem that a bonding shape is uneven due to the curing with bubbles, which are generated by moisture or residual solvent generated by a chemical reaction between the reducing agent and the oxide film on the surface of the solder particles, contained in the bonding layer, and a second problem that there is a problem in reliability such as disconnection or the like.

Technical objects to be achieved in the present invention are not limited to the aforementioned objects, and other technical objects not described above will be apparently understood to those skilled in the art from the following disclosure of the present invention.

Solution to Problem

In order to achieve the objects, an exemplary embodiment of the present invention provides a method for preparing an anisotropic conductive adhesive for a fine pitch including: (i) removing an oxide film of solder particles having self-fusion and self-orientation functions between metal terminals of a substrate by melting the solder particles at a predetermined temperature using a first reducing agent; (ii) removing moisture generated in step (i); and (iii) preparing an anisotropic conductive adhesive by mixing the solder particles from which the oxide film and the moisture are removed in steps (i) and (ii) with a binder resin, in which the step (iii) is performed in a state where a contact with oxygen is blocked.

In addition, the anisotropic conductive adhesive in step (iii) may further include a second reducing agent for preventing further oxidation of the solder particles.

In addition, an amount of the second reducing agent may be 0.01 to 3 parts by weight with respect to 100 parts by weight of the anisotropic conductive adhesive in step (iii).

In addition, the first reducing agent may be at least any one selected from the group consisting of 3-butenoic acid (BA), 1,3-bis(3-carboxypropyl)tetramethyl disiloxane, and 1,3-bis(2-carboxypropyl)tetramethyl disiloxane.

In addition, the second reducing agent may be at least any one selected from the group consisting of 3-butenoic acid (BA), 1,3-bis(3-carboxypropyl)tetramethyl disiloxane, and 1,3-bis(2-carboxypropyl)tetramethyl disiloxane.

In addition, in steps (i) and (ii), the solder particles and the first reducing agent may be added to a solvent so as to be reduced in a wet state and remove moisture.

In addition, steps (ii) and (iii) may be performed under a pressure lower than an atmospheric pressure.

In addition, in step (ii), the moisture may be removed by using a vacuum oven and heating and drying in a temperature range of 20 to 150° C. for 2 to 20 hours.

In addition, in step (ii), the moisture may be removed by using a vacuum heating stirrer and heating and stirring in a temperature range of 20 to 150° C. for 1 to 8 hours.

In addition, the solder particles may be contained in the binder resin in a ratio of 5 to 60 vol % based on the total amount of the anisotropic conductive adhesive.

In addition, the binder resin may be composed of a thermosetting resin, and the solder particles may have a melting point between a reaction initiation temperature and a curing temperature of the thermosetting resin.

In addition, the binder resin may be composed of a thermoplastic resin, and the solder particles may have a melting point higher than a glass transition temperature of the thermoplastic resin.

In addition, the binder resin may be composed of a photocurable resin.

In addition, the solder particles may have a size of 0.1 to 100 μm.

In addition, the solder particles may contain at least two of tin (Sn), indium (In), silver (Ag), and bismuth (Bi) and have a melting point of 70 to 200° C.

In addition, another exemplary embodiment of the present invention provides a method for preparing an anisotropic conductive adhesive for fine pitch including: (A) mixing solder particles having self-fusion and self-orientation functions between metal terminals of a substrate by melting the solder particles at a predetermined temperature, a binder resin, and a first reducing agent removing an oxide film of the solder particles; and (B) removing moisture generated in step (A) to prepare an anisotropic conductive adhesive, in which in step (A), the removal of the oxide film of the solder particles is performed simultaneously with the mixing of the solder particles, the binder resin, and the first reducing agent, and in steps (A) and (B), the removal of the oxide film of the solder particles is performed while the contact with oxygen is blocked.

In addition, yet another exemplary embodiment of the present invention provides an anisotropic conductive adhesive for fine pitch prepared by the method for preparing the anisotropic conductive adhesive for fine pitch according to the present invention.

In addition, the anisotropic conductive adhesive for fine pitch may have a viscosity of 10 to 10,000 cps in a temperature range of 80 to 200° C.

In addition, the anisotropic conductive adhesive for fine pitch may have a film form.

In addition, the anisotropic conductive adhesive for fine pitch may have a paste form.

In addition, still another exemplary embodiment of the present invention provides a method for mounting an electronic component comprising: (a) disposing an anisotropic conductive adhesive for fine pitch on a first substrate having a plurality of electrode terminals; (b) disposing a second substrate having a plurality of connection terminals on the first substrate to face the first substrate; (c) forming a connection body which electrically connects the plurality of electrode terminals and the connection terminals facing each other by melting the solder particles by heating the solder particles at a temperature that melts the solder particles without curing the binder resin in the anisotropic conductive adhesive for fine pitch; and (d) fixing the second substrate to the first substrate by curing the binder resin in the anisotropic conductive adhesive for fine pitch by heating at a curing temperature or more to form a curable resin layer, in which the anisotropic conductive adhesive for fine pitch is the anisotropic conductive adhesive for fine pitch according to the present invention.

Advantageous Effects of Invention

According to the present invention, the oxide film of the solder particles is removed using the reducing agent and then the moisture generated in the reduction reaction is previously removed and oxygen is blocked in the mixing of the binder resin to prevent additional oxidation. Therefore, the present invention has a first effect that bubbles are not generated in the electronic component mounting process, so that the bonding shape is constant, a second effect that the solder particles are molten and aggregate only between the metal terminals to form a connection body, so that there is no problem such as disconnection, and a third effect that in order to prevent additional oxidation, a small amount of reducing agent is added to prevent formation of the oxide film, without a problem of containing bubbles.

It should be understood that the effects of the present invention are not limited to the effects described above, but include all effects that can be deduced from the detailed description of the present invention or configurations of the invention described in claims.

DESCRIPTION OF EMBODIMENTS

Figure 1:
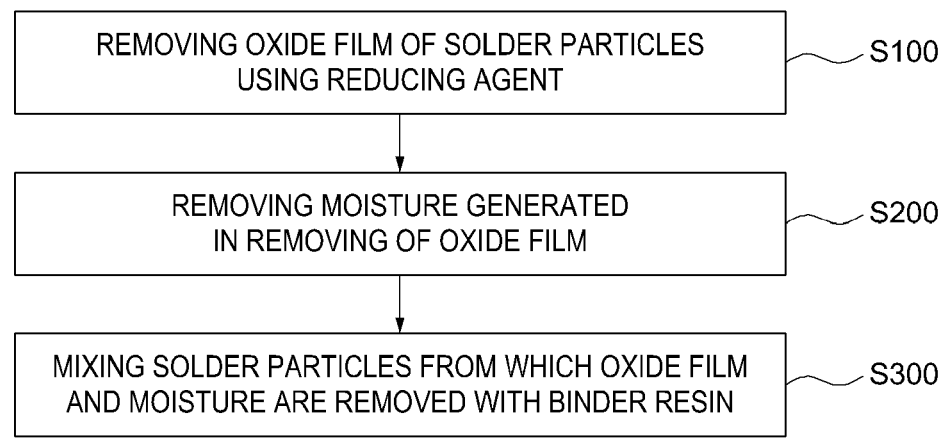
FIG. 1 is a flowchart illustrating a method for preparing an anisotropic conductive adhesive for fine pitch according to an exemplary embodiment of the present invention.

Hereinafter, the present invention will be described with reference to the accompanying drawings. However, the present invention may be embodied in many different forms and are limited to exemplary embodiments described herein. In addition, a part not related with a description is omitted in order to clearly describe the present invention in the drawings and throughout the specification, like reference numerals designate like elements.

Further, throughout the specification, when it is described that a certain part is "connected (accessed, contacted, coupled)" with another part, it means that the certain part may be "directly connected" with another part and a third part may be interposed therebetween as well, that may be "indirectly connected". In the present specification, unless explicitly described to the contrary, when any part "comprises" any element, the part may further include other elements, not the exclusion of any other elements.

Terms used in the present specification are used only to describe specific exemplary embodiments, and are not intended to limit the present disclosure. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

In the drawings, thicknesses of many layers and regions are exaggerated for clarity. When it is described that a certain part such as a layer, a film, a region, a substrate, etc., is located "on" another part, it means that the certain part may be located "directly on" the other part and another part may be interposed therebetween. In contrast, when it is described that a certain part is located "directly on" another part, it means that there is no third part therebetween.

Hereinafter, the present invention will be described in detail with reference to the accompanying drawings.

FIG. 1 is a flowchart illustrating a method for preparing an anisotropic conductive adhesive for fine pitch according to an exemplary embodiment of the present invention. Referring to FIG. 1, in a method for preparing an anisotropic conductive adhesive for fine pitch according to an exemplary embodiment, provided is a method for preparing an anisotropic conductive adhesive for fine pitch including: (i) removing an oxide film of solder particles having self-fusion and self-orientation functions between metal terminals of a substrate by melting the solder particles at a predetermined temperature using a first reducing agent (S100); (ii) removing moisture generated in step (i) (S200); and (iii) preparing an anisotropic conductive adhesive by mixing the solder particles from which the oxide film and the moisture are removed in steps (i) and (ii) with a binder resin (S300), in which the step (iii) is performed in a state where the contact with oxygen is blocked.

Hereinafter, the method for preparing an anisotropic conductive adhesive for fine pitch will be described for each step.

First, the oxide film of solder particles having self-fusion and self-orientation functions between metal terminals of a substrate is removed by melting the solder particles in a predetermined temperature using a first reducing agent.

The solder particles may be a low melting point solder having a melting point of 70 to 200° C. By using the solder particles having a low melting point, it is possible to suppress or prevent various members of the electronic component from being damaged by the thermal history. The solder particles may contain two or more of tin (Sn), indium (In), silver (Ag), and bismuth (Bi). For example, the solder particles may include 60Sn/40Bi, 52In/48Sn, 97In/3Ag, 57Bi/42Sn/1Ag, 58Bi/42Sn, and 96.5Sn/3.5Ag, but are not limited thereto. The size of the solder particles may be selected according to a size (e.g., pitch) of a conductive pattern to be applied, and as the size of the conductive pattern increases, a solder particle having a large particle size may be used. For example, the particle size of the low melting point solder may be selected in the range of 0.1 to 100 μm. However, if the size of the solder particles is larger than the numerical value, the melting point is increased and deterioration may occur in the mounting process of the electronic component.

The solder particles are in contact with oxygen in an atmosphere to easily form an oxide film on the surface. When an electronic component such as a semiconductor chip is mounted using the anisotropic conductive adhesive containing solder particles, due to the oxide film formed, there is a problem that unstable contact resistance results in electrical characteristics such as low electrical conductivity and unstable bonding strength. As a method for solving the problem, it was confirmed that in a process of mixing and distributing the solder particles and the binder resin to be described below, the anisotropic conductive adhesive is prepared by adding the reducing agent such as carboxylic acid to improve wetting of the solder particles and enhance coupling with contact points of wirings and signal lines. However, since bubbles generated by water generated by the chemical reaction between the reducing agent and the oxide film existing on the surface of the solder particles or by a residual solvent are cured while contained in the bonding layer, the bonding shape is uneven and the problem in reliability such as disconnection is caused.

In order to solve this problem, in the present invention, the oxide film of solder particles is first removed using a reducing agent. A first reducing agent used to remove the oxide film may be at least any one selected from the group consisting of 3-butenoic acid (BA), 1,3-bis(3-carboxypropyl) tetramethyl disiloxane, and 1,3-bis(2-carboxypropyl) tetramethyl disiloxane, but is not limited thereto and may use compounds having other carboxylic groups.

In the removing of the oxide film, the solder particles and the first reducing agent may be added to a solvent so as to be reduced in a wet state. In the removing of the moisture to be described below, the moisture may be removed from the reduced solder particles in a wet state. In the wet state, the step may be performed while blocking the contact with oxygen. Under the solvent, the solder particles are dispersed so that the surface area in contact with the reducing agent increases and the reduction reaction may occur more easily. The solvent is not particularly limited, but any solvent may be used as long as it is a solvent generally used in the anisotropic conductive adhesive. Preferably, toluene, methyl ethyl ketone, ethyl acetate, or a mixture of two or more thereof may be used as the solvent.

Second, the moisture generated in the first step is removed.

Water is produced by the chemical reaction between the oxygen atom of the oxide film removed in the first step and carboxylic acid, the reducing agent. When the generated moisture is left, since heating process is accompanied in the process of mounting the electronic component using the anisotropic conductive adhesive, moisture is vaporized in the heating process to generate bubbles, so that problems described above occur. Accordingly, the moisture is removed in advance in the process of preparing the anisotropic conductive adhesive.

At this time, the above step may be performed under a pressure lower than the atmospheric pressure in order to block contact with oxygen and to remove moisture easily. Although the moisture can be removed even in the atmospheric pressure, it is preferred that the removal of moisture is performed under a pressure lower than the atmospheric pressure in that the moisture may be removed at a lower temperature in a shorter time.

In the step, the moisture may be removed using a vacuum oven. The vacuum oven may be used with any conventional vacuum oven apparatus. In the step, heating and drying may be performed in a temperature range of 20 to 150° C. for 2 to 20 hours. When the range is less than 20° C. or less than 2 hours, sufficient moisture removal is not performed, and heating and drying at more than 150° C. or more than 20 hours are unnecessary because the generated moisture may be sufficiently removed at temperature and time lower than that. If the temperature in the vacuum oven is higher than the melting temperature of the solder particles, small liquid solder droplets may be combined with each other in order to lower the surface energy to grow into large droplets, and then there is a problem that the large droplets may be solidified to large solder powder during cooling. Therefore, it is preferred to be dried at 150° C. or less.

In the step, it is possible to remove moisture using a vacuum heating stirrer equipped with a vacuum exhaust device and capable of stirring in a vessel at a pressure lower than atmospheric pressure. In the case of the vacuum heating stirrer, moisture may be removed by heating and stirring in a temperature range of 20 to 150° C. for 1 to 8 hours. Under the pressure lower than the atmospheric pressure, a boiling point of moisture is lowered and the moisture is vaporized at a lower temperature to be removed, and when the reduced solder particles in the wet state are continuously stirred while heating, the generated bubbles may be easily removed to the outside and then defoamed. Therefore, in the case of using the vacuum heating stirrer, a removal time of the moisture may be rapidly shortened compared with heating and drying in a vacuum oven.

Third, the anisotropic conductive adhesive is prepared by mixing the solder particles from which the oxide film and the moisture are removed with the binder resin to disperse the solder particles. The step may be performed while the contact with oxygen is blocked.

The binder resin may be at least one selected from the group consisting of a thermosetting resin, a thermoplastic resin, and a photocurable resin. Among them, the thermosetting resin is preferable due to excellent mechanical properties such as a linear coefficient of expansion or the modulus of elasticity after curing.

The thermosetting resin is not particularly limited as long as it is molten and cured by heating, but thermosetting resins that can be generally used as an adhesive component for manufacturing a semiconductor device may be used. The thermosetting resin is not particularly limited, but may include, for example, epoxy resin, silicone resin, oxetane resin, phenol resin, (meth)acrylate resin, polyester resin (unsaturated polyester resin), diallyl phthalate resin, maleimide resin, polyimide resin (polyimide precursor resin), bismaleimide-triazine resin, and the like. In particular, it is preferable to use a thermosetting resin containing at least one selected from the group consisting of epoxy resin, (meth)acrylate resin, polyester resin, polyimide resin, silicone resin, maleimide resin, and bismaleimide-triazine resin is used. Particularly, among them, the epoxy resin is preferable from the viewpoint of excellent curability and storage stability, heat resistance of a cured product, moisture resistance, and chemical resistance. These thermosetting resins may be used alone or in combination of two or more.

It is preferable that the melting point of the solder particles is between a reaction initiation temperature and a curing temperature of the thermosetting resin. When the electronic component is heated in the mounting process, the solder particles need to first be molten before the thermosetting resin is cured to make a connection body, and the viscosity of the thermosetting resin needs to be lowered so that the solder particles molten in the heated state are smoothly aggregated. Thus, it is preferable that the melting point of the solder particles is between the reaction initiation temperature and the curing temperature of the thermosetting resin.

The thermoplastic resin is not particularly limited, but may include, for example, vinyl acetate-based, polyvinyl alcohol resin, polyvinyl butyral resin, vinyl chloride resin, (meth)acrylic resin, phenoxy resin, polyester resin, polyimide resin, polyamideimide resin, siloxane modified polyimide resin, polybutadiene resin, acrylic resin, styrene resin, polyethylene resin, polypropylene resin, polyamide resin, cellulose resin, isobutylene resin, vinyl ether resin, liquid crystal polymer resin, polyphenylene sulfide resin, polyphenylene ether resin, polyether sulfone resin, polyether imide resin, polyether ether ketone resin, polyurethane resin, styrene-butadiene-styrene copolymer, styrene-ethylene-butylene-styrene copolymer, polyacetal resin, polyvinyl butyral resin, polyvinyl acetal resin, butyl rubber, chloroprene rubber, acrylonitrile-butadiene copolymer, acrylonitrile-butadiene-acrylate copolymer, acrylonitrile-butadiene-styrene copolymer, polyvinyl acetate, etc. These thermoplastic resins may be homopolymers or copolymers consisting of at least two kinds of these thermoplastic resin components.

In the thermoplastic resin, it is preferred that the melting point of the solder particles is higher than a glass transition temperature of the thermoplastic resin. It is preferable that the solder particles have a melting point higher than the glass transition temperature of the thermoplastic resin because free movement of the solder particles in the resin is inhibited if the solder particles are molten before the thermoplastic resin is heated and molten.

The photocurable resin is a mixture of a photopolymerizable monomer or a photopolymerizable oligomer and a photopolymerization initiator, and has a characteristic that a polymerization reaction is initiated by light irradiation. Such a photopolymerizable monomer and photopolymerizable oligomer may include (meth)acrylate ester monomers, ether (meth)acrylates, urethane (meth)acrylates, epoxy (meth)acrylates, amino resin (meth)acrylate, unsaturated polyester, silicone-based resin, and the like.

In addition, the solder particles may be contained in the binder resin in a ratio of 5 to 60 vol % based on the total amount of the anisotropic conductive adhesive in consideration of fluidity and wettability. When the content is less than 5 vol %, the solder particles may be insufficient and the terminals may not be connected to each other, and when the content exceeds 60 vol %, the solder particles may remain excessively to cause a bridge between the adjacent terminals by the connection body so that a short circuit may occur.

The solvent required for mixing the solder particles and the binder resin may vary depending on the binder resin component. However, in the case of a solvent having a component without compatibility with the solvent used in the first step, a complicated process of completely removing the solvent used in the moisture removing step and then further introducing a solvent is required. Therefore, it is preferable to use a solvent which is the same as or compatible with the solvent of the first step.

Further, the step (iii) may be performed in an oxygen-free space to block the contact with oxygen. Alternatively, the step (iii) may be performed even under inert gas.

If the process that the solder particles from which the oxide film and the moisture are removed are mixed with the binder resin and dispersed is prepared in air containing oxygen, an oxide film may be formed on the surface by the oxidation reaction. Therefore, in order to prevent the formation of the oxide film, the wet state is maintained even after the second step to block the contact with oxygen, oxygen is removed by using a vacuum exhaust device in a closed space such as a vacuum chamber, or an inert gas atmosphere such as nitrogen gas is made to block the oxygen, thereby preparing an anisotropic conductive adhesive. It is possible to prevent the reformation of the oxide film by removing oxygen by other predetermined methods. The vacuum oven used in the second step may be used again for performing the step. On the other hand, in the step (ii), when the vacuum heating stirrer is used, the step is reduced to the wet state and the wet state of the moisture-free solder particles is maintained, and as a result, inert gas may not be required.

In addition, the anisotropic conductive adhesive in step (iii) may further include a second reducing agent for preventing further oxidation of the solder particles. The purpose of preventing the oxidation of the solder particles may be sufficiently achieved by the method for preparing the anisotropic conductive adhesive for fine pitch, but the second reducing agent may be further included to enhance wettability of the surface by reducing the solder particles on the anisotropic conductive adhesive exposed in the air in the electronic component mounting process and the surface oxide film of the metal terminal of the substrate. However, since the degree of reduction is low compared with the conventional method, the amount of the second reducing agent may be 0.01 to 3 parts by weight based on 100 parts by weight of the anisotropic conductive adhesive. The surface oxide film may be completely removed so as to be electrically bonded even within the range. Since the oxidation of the solder particles partially occurs only on the surface of the adhesive, bubbles generated when the moisture generated by the reduction reaction with the reducing agent is vaporized are not contained in a curable resin layer but removed to the outside, and as a result, no problem due to the bubbles occurs.

The second reducing agent may be at least any one selected from the group consisting of 3-butenoic acid (BA), 1,3-bis(3-carboxypropyl) tetramethyl disiloxane, and 1,3-bis(2-carboxypropyl)tetramethyl disiloxane, but is not limited thereto and may use compounds having other carboxylic groups.

Another exemplary embodiment of the present invention provides a method for preparing an anisotropic conductive adhesive for fine pitch including: (A) mixing solder particles having self-fusion and self-orientation functions between metal terminals of a substrate by melting the solder particles in a predetermined temperature, a binder resin, and a first reducing agent removing an oxide film of the solder particles; and (B) removing moisture generated in step (A) to prepare an anisotropic conductive adhesive, in which in step (A), the removal of the oxide film of the solder particles is performed simultaneously with the mixing of the solder particles, the binder resin, and the first reducing agent, and in steps (A) and (B), the removal of the oxide film of the solder particles is performed while the contact with oxygen is blocked.

Hereinafter, the method for preparing an anisotropic conductive adhesive for fine pitch according to the present invention will be described for each step.

First, solder particles having self-fusion and self-orientation functions between metal terminals of a substrate by being molten in a predetermined temperature, a binder resin, and a first reducing agent removing an oxide film of the solder particles are mixed. In the step, the removal of the oxide film of the solder particles may be performed simultaneously with the mixing of the solder particles, the binder resin, and the first reducing agent.

The solder particles may be a low melting point solder having a melting point of 70 to 200° C. By using the solder particles having a low melting point, it is possible to suppress or prevent various members of the electronic component from being damaged by the thermal history. The solder particles may contain two or more of tin (Sn), indium (In), silver (Ag), and bismuth (Bi). For example, the solder particles may include 60Sn/40Bi, 52In/48Sn, 97In/3Ag, 57Bi/42Sn/1Ag, 58Bi/42Sn, and 96.5Sn/3.5Ag, but are not limited thereto. The size of the solder particles may be selected according to a size (e.g., pitch) of a conductive pattern to be applied, and as the size of the conductive pattern increases, a solder particle having a large particle size may be used. For example, the particle size of the low melting point solder may be selected in the range of 0.1 to 100 μm. However, if the size of the solder particles is larger than the numerical value, the melting point is increased and deterioration may occur in the mounting process of the electronic component.

A first reducing agent used to remove the oxide film may be at least any one selected from the group consisting of 3-butenoic acid (BA), 1,3-bis(3-carboxypropyl) tetramethyl disiloxane, and 1,3-bis(2-carboxypropyl)tetramethyl disiloxane, but is not limited thereto and may use compounds having other carboxylic groups.

Further, the first reducing agent may not be removed together in a moisture removing step to be described below, but may be included in the prepared anisotropic conductive adhesive to prevent additional oxidation of the solder particles. The purpose of preventing the oxidation of the solder particles may be sufficiently achieved by the method for preparing the anisotropic conductive adhesive for fine pitch, but the first reducing agent may be further included to enhance wettability of the surface by reducing the surface oxide films of the solder particles on the anisotropic conductive adhesive exposed in the air in the electronic component mounting process and the metal terminal of the substrate. However, since the degree of reduction is low compared with the conventional method, the amount of the first reducing agent which is not removed but included may be 0.01 to 3 parts by weight based on 100 parts by weight of the anisotropic conductive adhesive. The surface oxide film may be completely removed so as to be electrically bonded even within the range. Since the oxidation of the solder particles partially occurs only on the surface of the adhesive, bubbles generated when the moisture generated by the reduction reaction with the reducing agent is vaporized are not contained in a curable resin layer but removed to the outside, and as a result, no problem due to the bubbles occurs.

In the mixing step, the solder particles, the binder resin, and the first reducing agent may be added to a solvent so as to be reduced in a wet state. In the removing of the moisture to be described below, the moisture may be removed from the reduced solder particles in a wet state. In the wet state, the step may be performed while blocking the contact with oxygen. Under the solvent, the solder particles are dispersed so that the surface area in contact with the reducing agent increases and the reduction reaction may occur more easily. The solvent is not particularly limited, but any solvent may be used as long as it is a solvent generally used in the anisotropic conductive adhesive. Toluene, methyl ethyl ketone, ethyl acetate, or a mixture of two or more thereof may be used as the solvent.

The step may be performed in a space in which oxygen is removed by using a vacuum exhaust device to block the contact with oxygen as in the moisture removing step to be described below. Alternatively, the step may be performed even under inert gas.

The binder resin may be at least one selected from the group consisting of a thermosetting resin, a thermoplastic resin, and a photocurable resin. Among them, the thermosetting resin is preferable due to excellent mechanical properties such as a linear coefficient of expansion or the modulus of elasticity after curing.

The thermosetting resin is not particularly limited as long as it is molten and cured by heating, but may use thermosetting resins that can be generally used as an adhesive component for manufacturing a semiconductor device. The thermosetting resin is not particularly limited, but may include, for example, epoxy resin, silicone resin, oxetane resin, phenol resin, (meth)acrylate resin, polyester resin (unsaturated polyester resin), diallyl phthalate resin, maleimide resin, polyimide resin (polyimide precursor resin), bismaleimide-triazine resin, and the like. In particular, it is preferable to use a thermosetting resin containing at least one selected from the group consisting of epoxy resin, (meth)acrylate resin, polyester resin, polyimide resin, silicone resin, maleimide resin, and bismaleimide-triazine resin is used. Particularly, among them, the epoxy resin is preferable from the viewpoint of excellent curability and storage stability, heat resistance of a cured product, moisture resistance, and chemical resistance. Further, these thermosetting resins may be used alone or in combination of two or more.

It is preferable that the melting point of the solder particles is between a reaction initiation temperature and a curing temperature of the thermosetting resin. When the electronic component is heated in the mounting process, the solder particles need to first be molten before the thermosetting resin is cured to make a connection body, and the viscosity of the thermosetting resin needs to be lowered so that the solder particles molten in the heated state are smoothly aggregated. Thus, it is preferable that the melting point of the solder particles is between the reaction initiation temperature and the curing temperature of the thermosetting resin.

The thermoplastic resin is not particularly limited, but may include, for example, vinyl acetate-based, polyvinyl alcohol resin, polyvinyl butyral resin, vinyl chloride resin, (meth)acrylic resin, phenoxy resin, polyester resin, polyimide resin, polyamideimide resin, siloxane modified polyimide resin, polybutadiene resin, acrylic resin, styrene resin, polyethylene resin, polypropylene resin, polyamide resin, cellulose resin, isobutylene resin, vinyl ether resin, liquid crystal polymer resin, polyphenylene sulfide resin, polyphenylene ether resin, polyether sulfone resin, polyether imide resin, polyether ether ketone resin, polyurethane resin, styrene-butadiene-styrene copolymer, styrene-ethylene-butylene-styrene copolymer, polyacetal resin, polyvinyl butyral resin, polyvinyl acetal resin, butyl rubber, chloroprene rubber, acrylonitrile-butadiene copolymer, acrylonitrile-butadiene-acrylate copolymer, acrylonitrile-butadiene-styrene copolymer, polyvinyl acetate, etc. These thermoplastic resins may be homopolymers or copolymers consisting of at least two kinds of these thermoplastic resin components.

In the thermoplastic resin, it is preferred that the melting point of the solder particles is higher than a glass transition temperature of the thermoplastic resin. It is preferable that the solder particles have a melting point higher than the glass transition temperature of the thermoplastic resin because free movement of the solder particles in the resin is inhibited if the solder particles are molten before the thermoplastic resin is heated and molten.

The photocurable resin is a mixture of a photopolymerizable monomer or a photopolymerizable oligomer and a photopolymerization initiator, and has a characteristic that a polymerization reaction is initiated by light irradiation. Such a photopolymerizable monomer and photopolymerizable oligomer may include (meth)acrylate ester monomers, ether (meth)acrylates, urethane (meth)acrylates, epoxy (meth) acrylates, amino resin (meth)acrylate, unsaturated polyester, silicone-based resin, and the like.

In addition, the solder particles may be contained in the binder resin in a ratio of 5 to 60 vol % based on the total amount of the anisotropic conductive adhesive in consideration of fluidity and wettability. When the content is less than 5 vol %, the solder particles may be insufficient and the terminals may not be connected to each other, and when the content exceeds 60 vol %, the solder particles may remain excessively to cause a bridge between the adjacent terminals by the connection body so that a short circuit may occur.

Second, the moisture generated in the first step is removed.

Water is produced by the chemical reaction between the oxygen atom of the oxide film removed in the first step and carboxylic acid, the reducing agent. When the generated moisture is left, since heating process is accompanied in the process of mounting the electronic component using the anisotropic conductive adhesive, moisture is vaporized in the heating process to generate bubbles, so that the problems occur. Accordingly, the moisture is removed in advance in the process of preparing the anisotropic conductive adhesive.

At this time, the step may be performed under a pressure lower than the atmospheric pressure using a vacuum exhaust device in order to block contact with oxygen and to remove moisture easily.

In the step, it is possible to remove moisture using a vacuum heating stirrer equipped with a vacuum exhaust device and capable of stirring in a vessel at a pressure lower than atmospheric pressure. In the case of the vacuum heating stirrer, moisture may be removed by heating and stirring in a temperature range of 20 to 150° C. for 1 to 8 hours. Under the pressure lower than the atmospheric pressure, a boiling point of moisture is lowered and the moisture may be vaporized at a lower temperature to be removed, and when the reduced solder particles in the wet state are continuously stirred while heating, the generated bubbles may be easily removed to the outside and then defoamed.

In the method for preparing the anisotropic conductive adhesive for fine pitch according to the present invention, the step of removing the oxide film by reducing the solder particles and the step of mixing the binder resin are simultaneously performed to reduce a processing process, and in step (b), in the case of vaporizing and defoaming the moisture from the reduced solder particles in the wet state under a pressure lower than atmospheric pressure using a vacuum heating stirrer, a time of removing the moisture is shortened, thereby efficiently preparing the anisotropic conductive adhesive for fine pitch.

In the method for preparing the anisotropic conductive adhesive for fine pitch according to the present invention, since the reducing agent is not added or added in a small amount in the adhesive compared with a conventional method, the contents of the solder particles and the binder resin are increased in the adhesive to further facilitate electrical connection between the terminals in the process of mounting the electronic component.

In addition, in the mixing step, additives such as a curing agent, a curing accelerator, and a modifier may be included as necessary. Since the additive is generally used in the art, the content thereof is not particularly limited and may be appropriately selected and used depending on the application.

Yet another exemplary embodiment of the present invention provides an anisotropic conductive adhesive for fine pitch prepared by the method for preparing the anisotropic conductive adhesive for fine pitch according to the present invention.

The anisotropic conductive adhesive for fine pitch may have a viscosity of 10 to 10,000 cps in a temperature range of 80 to 200° C. The viscosity may be adjusted according to an amount of the solvent used in the method for preparing the anisotropic conductive adhesive for fine pitch. The viscosity may be in the range of 10 to 1000 cps at a temperature at which the solder particles are molten by heating the adhesive in the electronic component mounting process. Since the viscosity of the anisotropic conductive adhesive is lowered, the molten solder particles may more easily flow to be aggregated.

In addition, the anisotropic conductive adhesive for fine pitch may be in the form of a film, or may be used in the form of a paste. Among them, a film type is preferable. The film type is superior to the paste type in terms of quality control such as electronic component mounting cost, thickness control, and adhesion reliability.

Still another exemplary embodiment of the present invention provides a method for mounting an electronic component comprising: (a) disposing an anisotropic conductive adhesive for fine pitch on a first substrate having a plurality of electrode terminals; (b) disposing a second substrate having a plurality of connection terminals on the first substrate to face the first substrate; (c) forming a connection body which electrically connects the plurality of electrode terminals and the connection terminals facing each other by melting the solder particles by heating the solder particles at a melting temperature without curing the binder resin in the anisotropic conductive adhesive for fine pitch; and (d) fixing the second substrate to the first substrate by curing the binder resin in the anisotropic conductive adhesive for fine pitch by heating at a curing temperature or more to form a curable resin layer, in which the anisotropic conductive adhesive for fine pitch is the anisotropic conductive adhesive for fine pitch according to the present invention.

Figure 2:
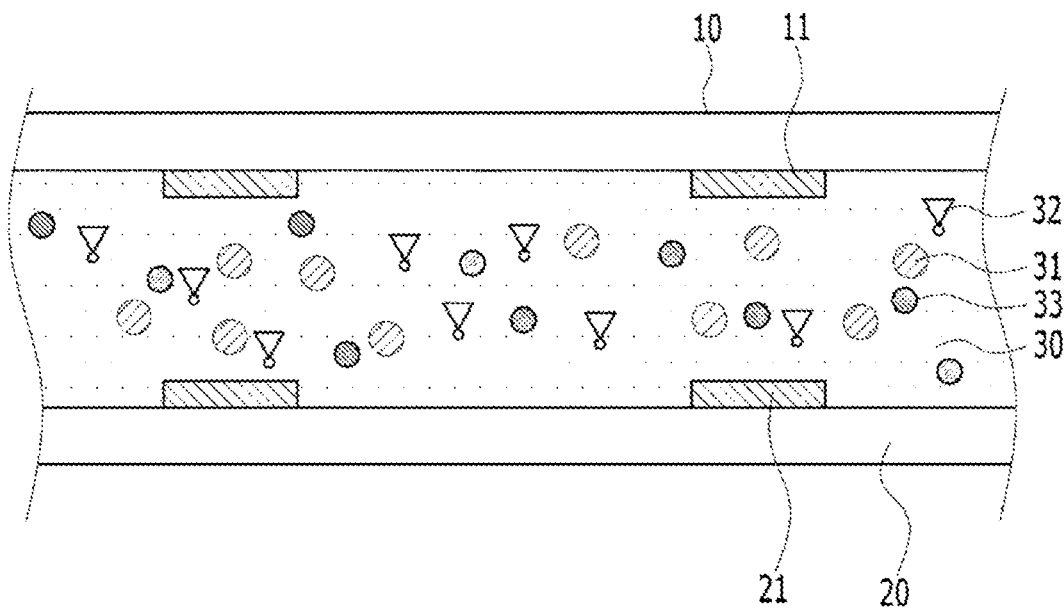
FIGS. 2 to 4 are schematic process diagrams illustrating a method for mounting an electronic component according to an exemplary embodiment of the present invention.
Figure 3:
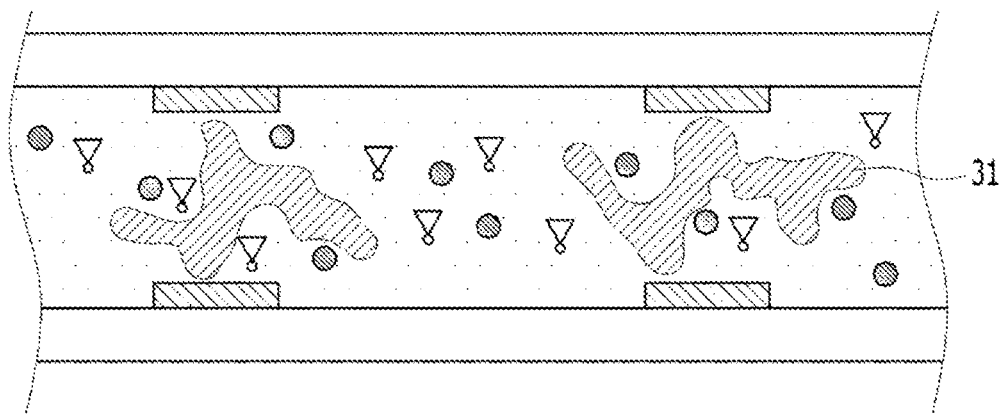
Figure 4:
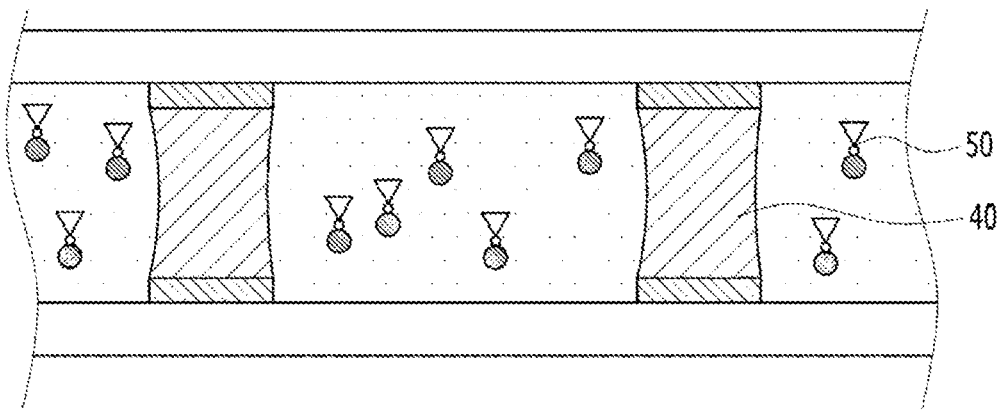

FIGS. 2 to 4 are schematic process diagrams illustrating a method for mounting an electronic component according to an exemplary embodiment of the present invention. Hereinafter, a method for mounting an electronic component using an anisotropic conductive adhesive for fine pitch according to the present invention will be described in detail with reference to FIG. 2 to FIG. 4.

Referring to FIG. 2, an anisotropic conductive adhesive 30 for fine pitch according to the present invention is disposed on a first substrate 20 having a plurality of electrode terminals 21, and then a second substrate 10 having a plurality of connection terminals 11 facing the first substrate 20 is disposed on the first substrate 20. In the anisotropic conductive adhesive 30 for fine pitch, solder particles 31 in which an oxide film and moisture are removed are dispersed and evenly spread in a binder resin 32 according to the method for preparing the anisotropic conductive adhesive for fine pitch of the present invention. A curing agent 33 may be further added in the anisotropic conductive adhesive 30 for fine pitch.

Referring to FIG. 3, the binder resin 32 in the anisotropic conductive adhesive 30 for fine pitch is not cured and the solder particles 31 are heated to a melting temperature and molten to form a connection body 40 electrically connecting the plurality of electrode terminals 21 and connection terminals 11 facing each other. When the solder particles 31 are heated to a melting temperature without applying separate pressure, while the solder particles 31 are molten, the solder particles 31 are self-fused and self-oriented with each other due to surface tension, and a fusion body of the larger solder particles 31 comes into contact with the upper and lower terminals made of metal.

Instead of using separate expensive equipment called a hot bar in the related art, a solder reflow line or general oven in the related art is used to selectively induce a connection to desired upper and lower terminals through metal binding only at a predetermined temperature without pressure, thereby improving adhesion between adherends, stabilizing a contact resistance, and protecting adhered components from being damaged due to pressure as technical problems in the related art. In addition, the solder particles are selectively connected only to a terminal portion and a part other than the terminal portion is composed of a resin composition to protect the terminal portion, and thus it is also effective for ion migration. In addition, since the solder particles are fused to the metal terminal portion by themselves at a predetermined temperature, the uniform arrangement of the upper and lower terminals is also induced.

Referring to FIG. 4, the binder resin 32 in the anisotropic conductive adhesive 30 for fine pitch is cured by heating at a curing temperature or more to form a curable resin layer 50, and the curable resin layer 50 fixes the second substrate 10 to the first substrate 20. In FIG. 3, the molten solder particles 31 form a connection body 40 for electrically connecting the electrode terminals 21 and the connection terminals 11 facing each other. Thereafter, when the temperature rises to the curing temperature or more, while the binder resin 32 and the curing agent 33 are heated to form the curable resin layer 50 by a curing reaction, the curing is performed to protect the connection body 40 fused between the upper and lower terminals to fix the first substrate 20 and the second substrate 10.

In the existing method, the oxide films of the surfaces of the solder particles and the metal terminal are removed in the process of mounting the electronic component by adding the reducing agent to the anisotropic conductive adhesive. However, the moisture generated by reduction in the curing process is vaporized and the generated bubbles are not discharged but remain in the curable resin layer, and thus the bonding shape is uneven and a problem in reliability such as disconnection is caused.

The anisotropic conductive adhesive for fine pitch prepared by the present invention is prepared by removing the oxide film of the solder particles and moisture using the reducing agent in advance in the preparing step and further mixing the binder resin in a state where oxygen is blocked, and thus the problems do not occur. In addition, a small amount of a reducing agent is added to prevent again formation of the oxide film on the surface that may occur during the electronic component mounting process, and thus the present invention has an advantage of improving the wettability of the solder particles, increasing the bonding strength, and improving the conductivity. Further, since the self-fusing and self-orientation may be selectively performed easily, it is possible to perform the connection of terminal unit of fine pitch and the pressure in the process is further unnecessary, it is possible to prevent expensive components from being damaged due to pressure.

EXAMPLES

Hereinafter, Examples of the present invention will be described as follows. However, the scope of the present invention is not limited by the following Examples.

Example 1

Solder particles having a composition ratio of 58Sn/42Bi are prepared, and 1,3-bis(3-carboxypropyl) tetramethyl disiloxane, which is a reducing agent, and the solder particles are put and stirred under a toluene solvent to remove an oxide film on the surface by reducing the solder particles. Moisture generated in the reduction reaction was heated and stirred at 130° C. for 2 hours in a vacuum heating stirrer, and defoamed to be removed.

A bisphenol A type epoxy resin, which is a thermosetting resin, was prepared as a binder resin, a phenol novolac resin was further prepared as a curing agent, and the solder particles in which the oxide film and the moisture were removed were mixed and stirred at room temperature to have a ratio of 50 vol % with respect to the binder resin to prepare a liquid anisotropic conductive adhesive for fine pitch. In addition, the adhesive was coated on a carrier film by a tape forming device and then dried and prepared in a film form to prepare the anisotropic conductive adhesive for fine pitch.

Example 2

Except that 1 part by weight of 1,3-bis(3-carboxypropyl) tetramethyl disiloxane, a reducing agent, was further added and mixed with respect to 100 parts by weight of an anisotropic conductive adhesive, an anisotropic conductive adhesive for fine pitch was prepared under the same condition as Example 1.

Comparative Example

Solder particles having a composition ratio of 58Sn/42Bi were prepared, a bisphenol A type epoxy resin, which is a thermosetting resin, was prepared as a binder resin, a phenol novolac resin was prepared as a curing agent, and then the solder particles were prepared to have a ratio of 50 vol % with respect to the binder resin and 10 parts by weight of 1,3-bis(3-carboxypropyl) tetramethyl disiloxane as a reducing agent was included with respect to 100 parts by weight of the anisotropic conductive adhesive and mixed at room temperature to prepare an anisotropic conductive adhesive.

Experimental Example

The anisotropic conductive adhesives of Example 1, Example 2 and Comparative Example were disposed between a printed circuit board (PCB) and terminals of a semiconductor chip, and, first, heated at a temperature of 180° C. for 20 seconds without separate pressure to melt the solder particles to form a connection body so as to be electrically connected between the terminals. Next, the binder resin was cured by heating at 200° C. for 180 seconds to fix the upper and lower substrates.

A contact resistance between the upper and lower terminals was measured. The contact resistance between the opposing terminals was measured at 12 points by a four-terminal method, an average value was calculated and then the results were shown in Table 1.

TABLE 1

|  | Example 1 | Example 2 | Comparative Example |
|---|---|---|---|
| Contact resistance (mΩ) | 6.5 | 5.1 | 30.5 |

It can be seen that the electrical characteristics of Examples 1 and 2 according to the present invention were improved as compared with Comparative Example.

The aforementioned description of the present invention is to be exemplified, and it can be understood by those skilled in the art that the technical spirit or required features of the present invention can be easily modified in other detailed forms without changing. Therefore, it should be appreciated that the aforementioned exemplary embodiments described above are all illustrative in all aspects and are not restricted. For example, respective constituent elements described as single types can be distributed and implemented, and similarly, constituent elements described to be distributed can also be implemented in a coupled form.

The scope of the present invention is represented by claims to be described below, and it is to be interpreted that the meaning and scope of the claims and all the changes or modified forms derived from the equivalents thereof come within the scope of the present invention.

REFERENCE SIGNS LIST

10: Second substrate
11: Connection terminal
20: First substrate
21: Electrode terminal
30: Anisotropic conductive adhesive for fine pitch
31: Solder particles
32: Binder resin
33: Curing agent
40: Connection body
50: Curable resin layer

The invention claimed is:

1. A method for preparing an anisotropic conductive adhesive for fine pitch, the method comprising:
    (i) forming a mixture by combining solder particles having an oxide surface film with a first carboxylic acid reducing agent, wherein the first carboxylic acid reducing agent reacts with the oxide surface film, thereby removing the oxide surface film from the solder particles and generating water in the mixture;
    (ii) removing the water generated in step (i) from the mixture at a predetermined temperature; and
    (iii) combining the mixture resulting from step (ii) with a binder resin and a second carboxylic acid reducing agent to prepare the anisotropic conductive adhesive,
    wherein step (iii) is performed in an oxygen-free space or an inert environment to block contact with oxygen; and
    wherein the solder particles have self-fusion and self-orientation functions when positioned between metal terminals of two substrates.

2. The method of claim 1, wherein step (iii) combines the mixture resulting from step (ii) with the binder resin and the second carboxylic acid reducing agent, for preventing oxidation of the solder particles.

3. The method of claim 2, wherein an amount of the second carboxylic acid reducing agent is 0.01 to 3 parts by weight with respect to 100 parts by weight of the anisotropic conductive adhesive.

4. The method of claim 2, wherein the second carboxylic acid reducing agent is at least one selected from the group consisting of 3-butenoic acid (BA), 1,3-bis(3-carboxypropyl) tetramethyl disiloxane, and 1,3-bis(2-carboxypropyl) tetramethyl disiloxane.

5. The method of claim 1, wherein the first carboxylic acid reducing agent is at least one selected from the group consisting of 3-butenoic acid (BA), 1,3-bis(3-carboxypropyl) tetramethyl disiloxane, and 1,3-bis(2-carboxypropyl) tetramethyl disiloxane.

6. The method of claim 1, wherein the mixtures resulting from steps (i) and (ii) further comprise a solvent, which is introduced in step (i) when combining the solder particles having the oxide surface film with the first carboxylic acid reducing agent.

7. The method of claim 1, wherein steps (ii) and (iii) are performed under a pressure lower than atmospheric pressure.

8. The method of claim 7, wherein step (ii) is performed with a vacuum oven, including heating and drying at a temperature range of 20 to 150° C. for 2 to 20 hours.

9. The method of claim 7, wherein step (ii) is performed with a vacuum heating stirrer, including heating and stirring at a temperature range of 20 to 150° C. for 1 to 8 hours.

10. The method of claim 1, wherein the solder particles are dispersed in the binder resin of the anisotropic conductive adhesive and are present in an amount of 5 to 60 vol %, based on the total volume of the anisotropic conductive adhesive.

11. The method of claim 1, wherein the binder resin comprises a thermosetting resin, and the solder particles have a melting point between a reaction initiation temperature and a curing temperature of the thermosetting resin.

12. The method of claim 1, wherein the binder resin comprises a thermoplastic resin, and the solder particles have a melting point greater than or equal to a glass transition temperature of the thermoplastic resin.

13. The method of claim 1, wherein the binder resin comprises a photocurable resin.

14. The method of claim 1, wherein the solder particles have a particle size of 0.1 to 100 μm.

15. The method of claim 1, wherein the solder particles contain at least two of tin (Sn), indium (In), silver (Ag), and bismuth (Bi), and the solder particles have a melting point of 70 to 200° C.

* * * * *